C. V. RICHARDSON.
COLLAPSIBLE CARRIAGE.
APPLICATION FILED JULY 7, 1919.
1,426,601.
Patented Aug. 22, 1922.
2 SHEETS—SHEET 1.
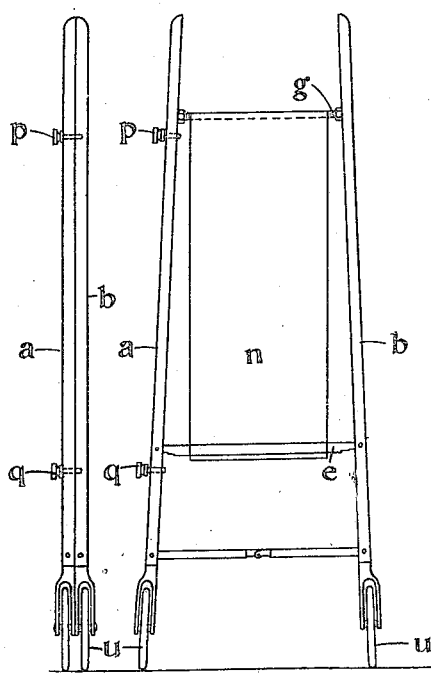
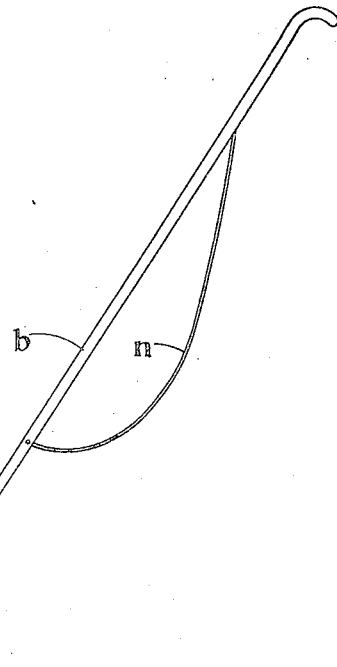
Fig.1.  Fig.2.  Fig.3.
Inventor
C. V. Richardson
by
W. E. Evans
Attorney.

C. V. RICHARDSON.
COLLAPSIBLE CARRIAGE.
APPLICATION FILED JULY 7, 1919.
1,426,601.
Patented Aug. 22, 1922.
2 SHEETS—SHEET 2.
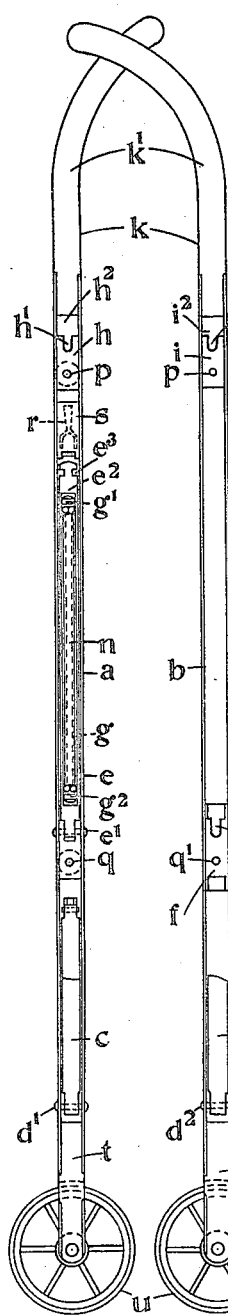
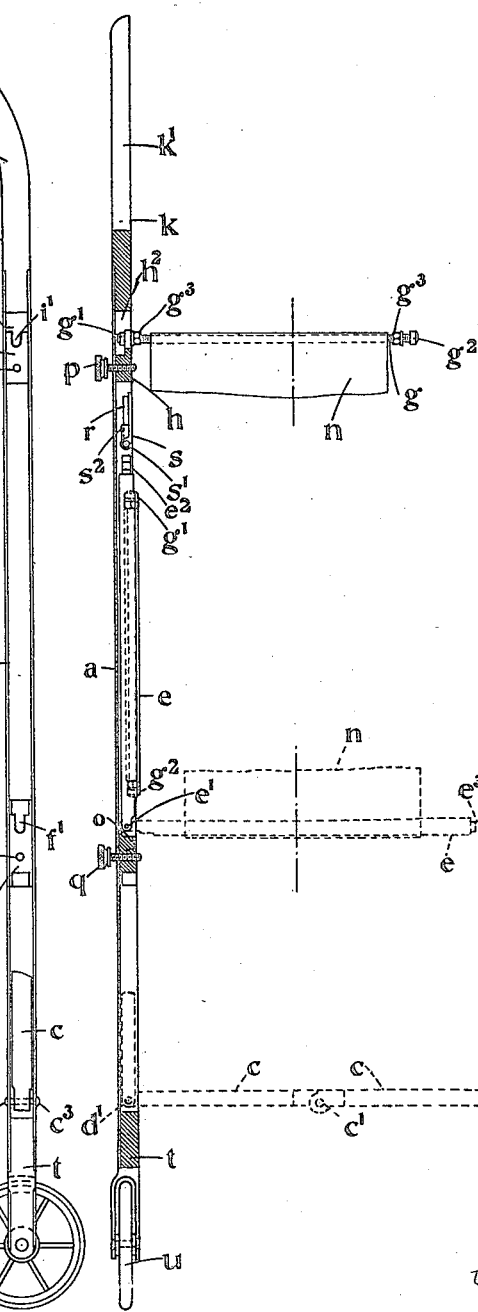
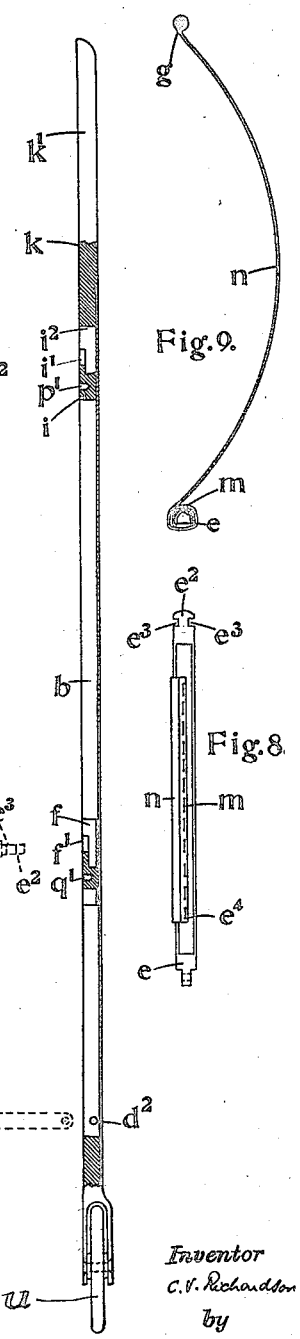
Fig.4.  Fig.5.  Fig.6.  Fig.7.
Fig.9.
Fig.8.
Inventor
C. V. Richardson
by
W. E. Evans
Attorney.

UNITED STATES PATENT OFFICE.

CHARLES VICTOR RICHARDSON, OF SAFFRON WALDEN, ENGLAND.

COLLAPSIBLE CARRIAGE.

1,426,601.

Specification of Letters Patent. Patented Aug. 22, 1922.

Application filed July 7, 1919. Serial No. 309,122.

*To all whom it may concern:*

Be it known that I, CHARLES VICTOR RICHARDSON, a subject of the King of Great Britain and Ireland, residing at 16 King Street, Saffron Walden, England, have invented certain new and useful Improvements Relating to a Collapsible Carriage, of which the following is a specification.

This invention relates to "push-carts" and the like for the use of children and has for its object to provide a "push-cart" capable of being collapsed so that in the collapsed condition all the accessory parts are enclosed within the frame members and the frame members brought into juxtaposition, so that the cart may in the collapsed condition be conveniently carried in one hand.

According to the invention two frame members are provided of symmetrical form being formed in the main part of their length of a curved or substantially semi-circular section, the cavities of the respective frame members being disposed on the inside and in opposite positions for the accommodation of the accessory parts and for their complete enclosure on the respective frame members being brought into parallel juxta-position and fastened together for being carried or for transport.

The respective frame members are advantageously provided straight and at the upper ends with handle parts of a curved shape. At their lower ends a U-shaped or fork shaped fitting is provided adapted for the reception of the wheel axles and the respective wheels mounted thereon.

The respective frame members are provided with means for the connection in opposite positions of the ends of transverse bars between which a seat of flexible material extends, while at the lower end a divided and jointed transverse bar may be pivotally connected in such position that on the frame members being drawn together the respective parts of the jointed transverse bar may be brought into parallel positions where they are completely enclosed within the frame members. Screwed bolts or pins, or other fastening means may be employed by which the respective frame members may be secured together on their being brought into juxta-position. The transverse bars used for the purpose of the seat may be so provided as completely to be enclosed within the respective frame members before the frame members are brought into juxta-position in the manner described.

By such a construction only two wheels are employed, and in the collapsed condition these wheels lie close together.

The invention comprises the construction which is hereinafter described.

The invention is illustrated in the accompanying drawings in which—

Figure 1 is a front elevation of a "push-cart" constructed according to the invention, in its collapsed or closed condition.

Figure 2 is a corresponding front elevation of the "push-cart" open or in its condition for use.

Figure 3 is a side elevation corresponding to Figure 2.

Figures 4 and 5 are detail side views of the inner faces of the frame members, the accessory parts being shown in Figure 4 in the positions made for their reception within one of the frame members.

Figure 6 is a detail front elevation mainly in longitudinal section of the frame member illustrated in Figure 4.

Figure 7 is a detail front elevation mainly in longitudinal section of the frame member illustrated in Figure 5.

Figure 8 is a detail front view of the lower transverse bar for the seat, and

Figure 9 is a detail sectional elevation showing the manner in which the flexible seat is supported by the upper and lower transverse bars.

In carrying the invention into effect according to one construction, I provide two symmetrical frame members $a$ $b$ having a substantially semi-circular section with the cavities of the section oppositely disposed on the inside. These frame members are permanently connected together in one position advantageously by a jointed transverse bar $c$ connecting the respective frame members conveniently near their lower ends. This bar $c$ may be divided and jointed in the middle at $c^1$, and at its outer ends may respectively be jointed to the frame members $a$ and $b$ by means of pins $d^1$ $d^2$ passing through the oppositely disposed walls of the curved section. Such a divided bar may serve as a foot rest for the child using the "push-cart". In a position immediately above that at which the jointed bar $c$ is connected, the lower bar $e$ for the seat may be pivotally connected at $e^1$ to a fitting $o$ secured in position to extend across the cavity in the frame member $a$, in such manner that the bar $e$ may be turned outwards into a transverse position with respect to the frame member $a$ to extend across for connection to the other frame member as illustrated in dotted lines in Figure 6, and its opposite end may be provided with a terminal fitting $e^2$ adapted to engage within a slotted fitting $f$ secured upon the frame member $b$ in a position immediately opposite that at which the bar is pivotally secured at $e^1$. The lower transverse bar $e$ is advantageously provided of a curved transverse section as illustrated in Figure 9 generally corresponding to the substantially semi-circular section of the frame member $a$, and so that when the transverse bar $e$ is turned into alignment with the frame member $a$, it may lie within the cavity as illustrated in full lines in Figure 6, and permit of the frame members $a$ $b$ being brought together closely into the position illustrated in Figure 1. In this position the lower transverse bar $e$ has its cavity exposed, and is thus adapted for the reception of the upper transverse bar $g$ for the seat.

The upper transverse bar $g$ for the seat is advantageously provided as a rod having heads $g^1$ $g^2$ at its respective ends, which are adapted to engage within plates or fittings $h$, $i$ respectively provided on the inside of the frame members $a$ and $b$ in a position near the lower part of the handles $k$, these fittings $h$ and $i$ being provided with open slots $h^1$ $i^1$ and with a recess $h^2$ $i^2$ immediately above, through which the respective heads $g^1$ $g^2$ of the bar $g$ may pass. On being introduced into position in these recesses $h^2$ $i^2$, the bar $g$ is forced downwards, so that the respective heads $g^1$ $g^2$ engage on the inside of the respective slotted plates or fittings $h$ $i$, and so that the stem of the bar $g$ passes through the respective slots $h^1$ $i^1$ therein.

The respective ends of the upper bar $g$ are advantageously screw threaded and a nut $g^3$ is provided at the respective ends, in a position near the heads $g^1$ and $g^2$, so that on these nuts being turned, the respective plates or fittings $h$ $i$ are tightly engaged between the nut $g^3$ and the head $g^1$ or $g^2$ and thus the bar $g$ is very securely retained in position.

The lower bar $e$ for the seat is advantageously provided at its outer end with the terminal fitting $e^2$ having slots $e^3$ formed in opposite positions to engage in the slot $f^1$ formed within the plate or fitting $f$ extending transversely across the cavity on the inside of the frame member $b$.

A series of holes $e^4$ may be provided in the length of the lower bar $e$ for the seat, through which a thread or wire $m$ (Figure 8) may pass for the retention of the end of the flexible seat $n$ of canvas or any other flexible material, and the opposite end of the length of flexible material employed may be secured to the upper bar $g$ for the seat, in any convenient way. The material $n$ may be passed completely round the bar $e$ as illustrated in Figure 9 so as to minimize the stress imposed upon the thread or wire $m$.

The length of the jointed transverse bar $c$ and the respective upper and lower transverse bars $e$ and $g$ for the seat are advantageously such as illustrated in Figure 6, that the frame members $a$ $b$, when connected, incline towards each other in an upward direction as illustrated in Figure 2, so that thus on the upper bar $g$ for the seat, being locked in its position by means of the nuts $g^3$ in the manner described, the whole construction is rigid, and the lower transverse bar $c$ is not liable to work loose, although no special means are provided for retaining the free end of the lower bar $e$ in its engaged position.

The respective fittings $o$ $h$ and $f$ $i$ provided for the reception of the upper and lower transverse bars $e$ and $g$ for the seat, may serve for the reception of fastening screws $p$ $q$, these latter being advantageously mounted in the fittings $o$ and $h$ respectively upon the frame member $a$ in such position, that on the frame members being brought together, so that their edges are in close contact, the end of the fastening screws $p$ $q$ are in alignment with screw threaded holes $p^1$ $q^1$ in the respective fittings $f$ and $i$ upon the opposite frame member $b$, so that on the heads of these fastening screws $p$ $q$ being turned, the two frame members $a$ $b$ are firmly connected together at two positions in their length as illustrated in Figure 1.

The shape of the handle parts $k$ of the frame members $a$ $b$ is such that flat faces $k^1$ are formed on the inside, and so that the handle parts when brought together may conveniently be grasped by one hand.

It will be understood that in use the frame members $a$ $b$ are held in an inclined position such as illustrated in Figure 3, and their length is such that the frame members can conveniently be held in an inclined position by a person standing, while the length of the flexible material $n$ of the seat, and the distance apart of the upper and lower bars $e$ $g$, is such that the flexible material $n$ hangs between the respective bars $e$, $g$ to form a seat in the manner of a deck chair.

The frame members, the fittings therein, the handles $k$, the forked fittings $t$ for carrying the rubber tired wheels $u$, as well as the transverse bars may be provided of steel, aluminium or other suitable material, and the respective parts may be brazed or otherwise secured in position. The stems of the forked fittings $t$ may be provided of a semi-circular section so as to fit within the cavities at the respective ends of the frame members $a$ $b$.

The fittings by means of which the upper and lower bars for the seat are secured to the frame members $a$ $b$ may be other than hereinbefore described; but it is preferred to provide the fittings $f$, $i$ and $h$ to comprise slotted plates extending on the inner face of the frame member $a$ or $b$ and across the cavity therein, for the reception of the ends of the respective bars $e$ and $g$ in the manner described.

Furthermore it will be understood that the upper bar $g$ for the seat has the flexible material $n$ wound upon it before it is placed within the cavity in the lower transverse bar $e$, and means may be provided by which the upper transverse bar $g$ may be retained in the cavity in the lower transverse bar.

It is preferred to provide the lower transverse bar $e$ of a curved section deeper than a semi-circle as illustrated in Figure 9, that is to say the bar $g$ may be passed into position within the cavity in the bar $e$ and be retained there without special means being provided for this purpose.

It will be understood that the bar $e$ can be turned back into the position indicated in full lines in Figure 6, and in that position carry the bar $g$ with the flexible material $n$ of the seat wound upon it so as not unduly to protrude, and so that the frame member $b$ may be brought forward with its edges in close contact or proximity to those of the frame member $a$. Similarly the respective divided parts of the bar $c$ may be received into the cavities of the frame members $a$ and $b$ respectively.

The cavity in one of the frame members $a$ may be utilized for mounting a spanner $r$ by means of which the nuts $g^3$ may be manipulated. For this purpose a plate $s$ may be pivotally mounted in a convenient position on one of the frame members $a$ upon a pin $s^1$ passing transversely across the cavity, the plate $s$ being mounted thereon under the action of a spiral spring so as normally to maintain this plate in a position extending transversely across the cavity in the position illustrated in Figures 4 and 6. A hook fitting $s^2$ may be provided on the inner face of the plate $s$ for the retention of the end of the spanner $r$ so that on the plate $s$ being turned outwardly the spanner $r$ may be passed into position on the inner face of the pivoted plate to engage the hook fitting $s^2$, or be withdrawn in that position.

I claim:

1. A collapsible carriage, comprising two oppositely disposed longitudinal frame members having a wheel at the respective lower ends and having their respective upper ends adapted to serve as handles, the said frame members having cavities on their oppositely disposed sides adapted on the said frames being brought together into coincidence to form a complete enclosure, transversely disposed bars adapted for connection to and between said longitudinal frame members in determined positions for maintaining the said frame members spaced apart for use and for the reception of the upper and lower ends of a flexible seat respectively, and means on the said longitudinal frame members for the connection of the said bars and for permitting of their withdrawal into and their disposition within the said cavities with the flexible seat rolled around one of the said bars, substantially as described.

2. A collapsible carriage comprising two oppositely disposed longitudinal frame members having a wheel at the respective lower ends and having their respective upper ends adapted to serve as handles, the said frame members having cavities on their oppositely disposed sides adapted on the said frames being brought together into coincidence to form a complete enclosure, two transversely disposed bars adapted for connection to and between the said longitudinal frame members in determined positions for the reception of the upper and lower ends of a flexible seat, a third transversely disposed jointed bar connecting the said frame members together near their lower ends, and means on the said longitudinal frame members for the connection of the said bars and for permitting of their withdrawal into and their disposition within the said cavities with the flexible seat rolled around one of the said bars, substantially as described.

3. A collapsible carriage comprising two oppositely disposed longitudinal frame members having a wheel at the respective lower ends and having their respective upper ends adapted to serve as handles, the said frame members having cavities on their oppositely disposed sides adapted on the said frames being brought together into coincidence to form a complete enclosure, means for securing the frames to each other on being brought together into coincidence as aforesaid, transversely disposed bars adapted for connection to and between said longitudinal frame members in determined positions for maintaining the said frame members spaced apart for use and for the reception of the upper and lower ends of a flexible seat respectively, and means on the said longitudinal frame members for the connection of the said bars and for permitting of their withdrawal into and their disposition within the said cavities with the flexible seat rolled around one of the said bars, substantially as described.

4. A collapsible carriage comprising two oppositely disposed frame members having wheels at their lower ends, movable transverse bars for connecting the said frame members, one of the said movable transverse bars being pivotally attached to one of said frame members and provided for the reception of the lower part of a flexible seat and having a curved transverse section forming a cavity, another of said transverse bars being provided as a rod and adapted for the reception of the upper end of the flexible seat, the said rod being capable of being applied within the cavity in the said transverse bar having the curved transverse section when the frame members are to be brought into their position out of use, and cavities in the said frame members and means for securing the frame members together into coincident positions on their being brought into close contact or proximity, substantially as described.

5. A collapsible carriage comprising two oppositely disposed frame members having wheels at their lower ends, said frame members having a curved transverse section forming oppositely disposed cavities, movable transverse bars for connecting the said frame members and comprising a jointed rod whose ends are pivotally connected in opposite positions to the said frame members, a bar for the reception of the lower part of the flexible seat, said bar being pivotally mounted upon one of the frame members and adapted to be brought when in the position out of use into the cavity within the said frame member, the said bar being provided at the end opposite to that at which it is pivoted with a fitting by which it may be connected in an opposite position to the other frame member and a bar for the reception of the upper part of the flexible seat, the said bar being adapted to be removably connected in opposite positions upon and between the said frame members, and means for securing the frame members in close contact or proximity to each other, substantially as described.

6. A collapsible carriage comprising two oppositely disposed frame members having wheels at their lower ends, said frame members having oppositely disposed cavities, fittings in opposite positions on the inner sides of the said frame members for the reception of the ends of transverse bars to carry the flexible seat, said fittings comprising a slotted plate adapted to be engaged by the ends of the respective transverse rods, and means for connecting the frame members in close contact or proximity to each other on their being brought together into coincident positions for convenience of carriage when the push cart is out of use, substantially as described.

7. A collapsible carriage comprising two oppositely disposed frame members having wheels at their lower ends, said frame members having oppositely disposed cavities transverse bars for connecting the said frame members, one of the said transverse bars being jointed and pivotally connected in opposite positions near the lower ends of the said frame members, another transverse bar being of shorter length than the jointed bar and adapted for the reception of the lower part of the flexible seat and another transverse bar shorter than the former and adapted for the reception of the upper end of the flexible seat, means for the connection of the ends of the said last two transverse bars referred to in opposite positions on the frame members, and means for connecting the said frame members together into coincident positions for convenience of carriage when the push cart is out of use, substantially as described.

CHARLES VICTOR RICHARDSON.